C. H. HOLMES.
Stove-Pipes.

No. 147,265.          Patented Feb. 10, 1874.

Witnesses:
Otto L. Johnson.
Howard J. Etheridge

Inventor:
Charles H. Holmes.

UNITED STATES PATENT OFFICE.

CHARLES H. HOLMES, OF MARSHALL, MICHIGAN.

IMPROVEMENT IN STOVE-PIPES.

Specification forming part of Letters Patent No. 147,265, dated February 10, 1874; application filed December 3, 1873.

*To all whom it may concern:*

Be it known that I, CHARLES H. HOLMES, of Marshall, in the county of Calhoun and State of Michigan, have invented an Improved Clamp for Stove-Pipes, of which the following is a specification:

This invention relates to a clamp, operated by means of a thumb-screw, for connecting sections of stove-pipe together, and is riveted to the overlapping end, so that by unscrewing the clamp the end of the pipe is enlarged, which allows another section to be easily inserted, and a reverse movement of the thumb-screw fastens the two sections firmly together.

Figure 1:
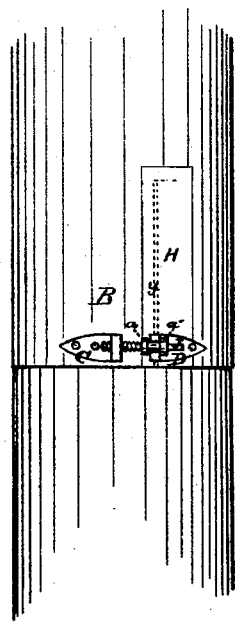
Figure 2:
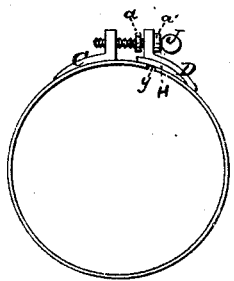

In the accompanying drawing illustrating my invention, Figure 1 is a plan view, and Fig. 2 a side elevation, of my invention, as applied to the pipe.

Similar letters of reference indicate like parts.

The letters C D represent the L-shaped parts of the clamp, which are of equal size. Into the part C I tap a thumb-screw, J, provided with two collars, $a$ $a'$. The part D is slotted, as shown in Fig. 1. Previous to riveting the clamp near the end of the overlapping section B of the stove-pipe, I cut out of said section a narrow and sufficiently long strip, $y$, as shown in dotted lines, Fig. 1, so as to allow the overlapping end of section B to be enlarged, that another section of the same size pipe may easily fit into it. I cover the slot made in the pipe with a rectangular strip of sheet-iron, H, and rivet it to the pipe, so as to arrest the escape of sparks. I do not intend to apply this clamp to every section in a stove-pipe, but only at such points where joints are necessary in taking down a stove-pipe to be cleaned.

Having thus described my invention, what I claim as my invention, and desire to secure by Letters Patent, is—

A stove-pipe, B, slotted at $y$, and provided with a covering-plate, H, the plates C D, thumb-screw J swiveled in plate D and engaging in plate C, whereby said pipe is connected with pipes of different sizes, substantially as shown and described.

To the above specification of my invention I have signed my name this 28th day of November, A. D. 1873.

CHARLES H. HOLMES.

Witnesses:
HOWARD J. ETHERIDGE,
CHARLES E. BROOKS.